United States Patent
Neumann et al.

(10) Patent No.: US 8,813,560 B2
(45) Date of Patent: Aug. 26, 2014

(54) FLUID RESERVOIR FOR A MOTOR VEHICLE HYDRAULIC BRAKE SYSTEM

(75) Inventors: Hans-Jürgen Neumann, Rüsselsheim (DE); Peter Tandler, Kronberg/Ts. (DE); Swen Ottmann, Frankfurt (DE)

(73) Assignee: Continental Teves AG & Co. oHG (DE)

( * ) Notice: Subject to any disclaimer, the term of this patent is extended or adjusted under 35 U.S.C. 154(b) by 11 days.

(21) Appl. No.: 13/388,318

(22) PCT Filed: Apr. 28, 2011

(86) PCT No.: PCT/EP2011/056690
§ 371 (c)(1),
(2), (4) Date: Feb. 1, 2012

(87) PCT Pub. No.: WO2011/138207
PCT Pub. Date: Nov. 10, 2011

(65) Prior Publication Data
US 2013/0036814 A1    Feb. 14, 2013

(30) Foreign Application Priority Data

May 4, 2010  (DE) .......................... 10 2010 028 530

(51) Int. Cl.
*G01F 23/00* (2006.01)
*B60T 11/26* (2006.01)
*B60T 17/22* (2006.01)

(52) U.S. Cl.
CPC .............. *B60T 11/26* (2013.01); *B60T 17/225* (2013.01)
USPC ...................................................... 73/290 R

(58) Field of Classification Search
CPC .............................. G01F 23/62; B60T 17/225
See application file for complete search history.

(56) References Cited

U.S. PATENT DOCUMENTS

| | | | | |
|---|---|---|---|---|
| 3,576,959 A | * | 5/1971 | Bogosoff | 200/84 C |
| 4,356,729 A | * | 11/1982 | Kubota et al. | 73/308 |
| 4,444,052 A | * | 4/1984 | Reinartz et al. | 73/308 |
| 4,487,021 A | * | 12/1984 | Arakawa et al. | 60/534 |
| 4,841,107 A | * | 6/1989 | Tandler et al. | 200/84 C |
| 5,041,812 A | * | 8/1991 | Misaizu et al. | 340/450.3 |
| 5,254,815 A | * | 10/1993 | Nakano et al. | 200/84 C |

FOREIGN PATENT DOCUMENTS

DE            37 16 135 A1    11/1988

* cited by examiner

*Primary Examiner* — Hezron E Williams
*Assistant Examiner* — Mark A Shabman
(74) *Attorney, Agent, or Firm* — RatnerPrestia

(57) ABSTRACT

A motor vehicle hydraulic brake system fluid reservoir for use with an electronic control unit. The hydraulic brake system fluid reservoir has a housing including a reservoir interior space having at least one fluid chamber, and a device for monitoring a reservoir filling level including a switch unit, which with a contact carrier projects into a guide sleeve, which extends into a separate chamber of the reservoir interior space. A sensor element or switch element is arranged on the contact carrier and is operable by a pickup carried on the guide sleeve at a switching point, at which the switch unit generates a signal for the electronic control unit. The separate chamber is connected to the fluid chamber by way of a fluid connection. Valve means are also provided, which serves to control the fluid flow between the separate chamber and the fluid chamber.

8 Claims, 2 Drawing Sheets

STATE OF THE ART

FLUID RESERVOIR FOR A MOTOR VEHICLE HYDRAULIC BRAKE SYSTEM

CROSS REFERENCE TO RELATED APPLICATIONS

This application is the U.S. National Phase Application of PCT/EP2011/056690, filed Apr. 28, 2011, which claims priority to German Patent Application No. 10 2010 028 530.7, filed May 4, 2010, the contents of such applications being incorporated by reference herein.

FIELD OF THE INVENTION

The invention relates to a fluid reservoir for a motor vehicle hydraulic brake system, with a housing comprising a reservoir interior space having at least one fluid chamber and a device for monitoring a reservoir filling level comprising a switch unit, which with a contact carrier projects into a guide sleeve, which extends into a separate chamber of the reservoir interior space, a sensor element or switch element arranged on the contact carrier being operable by means of a pickup carried on the guide sleeve at a switching point, at which the switch unit generates a signal for an electronic control unit, and the separate chamber being connected to the fluid chamber by way of a fluid connection.

BACKGROUND OF THE INVENTION

In a motor vehicle hydraulic brake system the necessary fluid, that is to say the brake fluid, is situated in the fluid reservoir, the reservoir filling level being monitored by the magnet, which serves for operating switching contacts. If the filling level of the brake fluid falls, the switching contacts are operated. This signal is evaluated in an electronic control unit and the driver of the motor vehicle can be alerted by a light or the like. At the same time it must be ensured that the fluid reservoir is always filled with a minimum quantity of brake fluid, so as not to put the working of the brake system at risk. Devices in which the float operates a reed contact as soon as the float assumes a predefined position (switching point), at which the reservoir filling level falls below a defined minimum, are generally used for monitoring a reservoir filling level. The switching of the reed contact triggers a warning signal perceptible to the driver, who should then take suitable remedial measures.

DE 37 16 135 A1, which is incorporated by reference, for example, discloses such a fluid reservoir. In order to exercise better control over the dynamics of the brake fluid, the inside walls, which define the chambers in the reservoir interior space, are usually equipped with fluid connections in the form of gaps, overflows etc.

If the fluid reservoirs are also equipped with a device for monitoring a reservoir filling level (warning device), the guide sleeve and the float are provided in a separate float chamber, on account of the fluid dynamics, which can give rise to the following problems: in braking, acceleration or cornering and under any combination of these demands, the shape of the reservoir may cause the fluid to flow out of the float chamber too rapidly, so that the float falls and operates the warning device. Operation of the warning device gives rise to an unwanted display and/or to entry in a vehicle fault memory, and the driver is required to go to a service workshop in order to have the fault cleared.

In order to prevent a rapid outflow of fluid from the separate chamber, the fluid connection may be provided in the form of a very small gap, for example, although this has a detrimental effect on the return of fluid into the chamber. This can likewise give rise to an incorrect operation of the warning device.

One remedy is afforded by the use of a timing element, which delays the operation of the warning device. However, the additional costs are seen as a disadvantage.

SUMMARY OF THE INVENTION

An aim of the present invention is to provide a fluid reservoir improved in this respect.

According to aspects of the invention this is achieved by the provision of valve means, which serve to control the fluid flow between the separate chamber and the fluid chamber. This makes it possible to counteract extreme positions of the fluid reservoir and the associated fluid dynamics, so that an incorrect display of the warning device can be excluded. This saves the need for a cost-intensive timing element.

The valve means preferably restrict an outflow of the fluid from the separate chamber into the fluid chamber and allow an accelerated return from the fluid chamber into the separate chamber. An unwanted fall of the fluid filling level in the float chamber is thereby excluded. At the same time fluid, which has escaped from the float chamber, can flow back rapidly again.

According to an advantageous development of the invention the fluid connection is embodied as a gap opening of a chamber wall in the area of a reservoir base and the valve means are arranged on the reservoir base at a predefined distance from the gap opening.

Here the distance of the valve means is one criterion for controlling the fluid flow, which can be varied according to the demands placed on the fluid reservoir.

The valve means are preferably embodied as a dome, which extends from the reservoir base into the reservoir interior space. This facilitates manufacturing of the fluid reservoir and the valve means. The housing of the fluid reservoir generally comprises two injection-molded housing parts, which are welded together. The dome can therefore be injection-molded onto the reservoir base during manufacture of the lower housing part.

According to an advantageous embodiment of the invention the valve means, in cross section, are of substantially lunate design.

In an alternative advantageous embodiment the valve means, in cross section, are of substantially semi-circular design, one face being intended to face the gap opening.

The face may preferably be of uneven design.

BRIEF DESCRIPTION OF THE DRAWINGS

The invention is best understood from the following detailed description when read in connection with the accompanying drawing. Included in the drawing is the following figure.

DETAILED DESCRIPTION OF THE PREFERRED EMBODIMENTS

Figure 1:
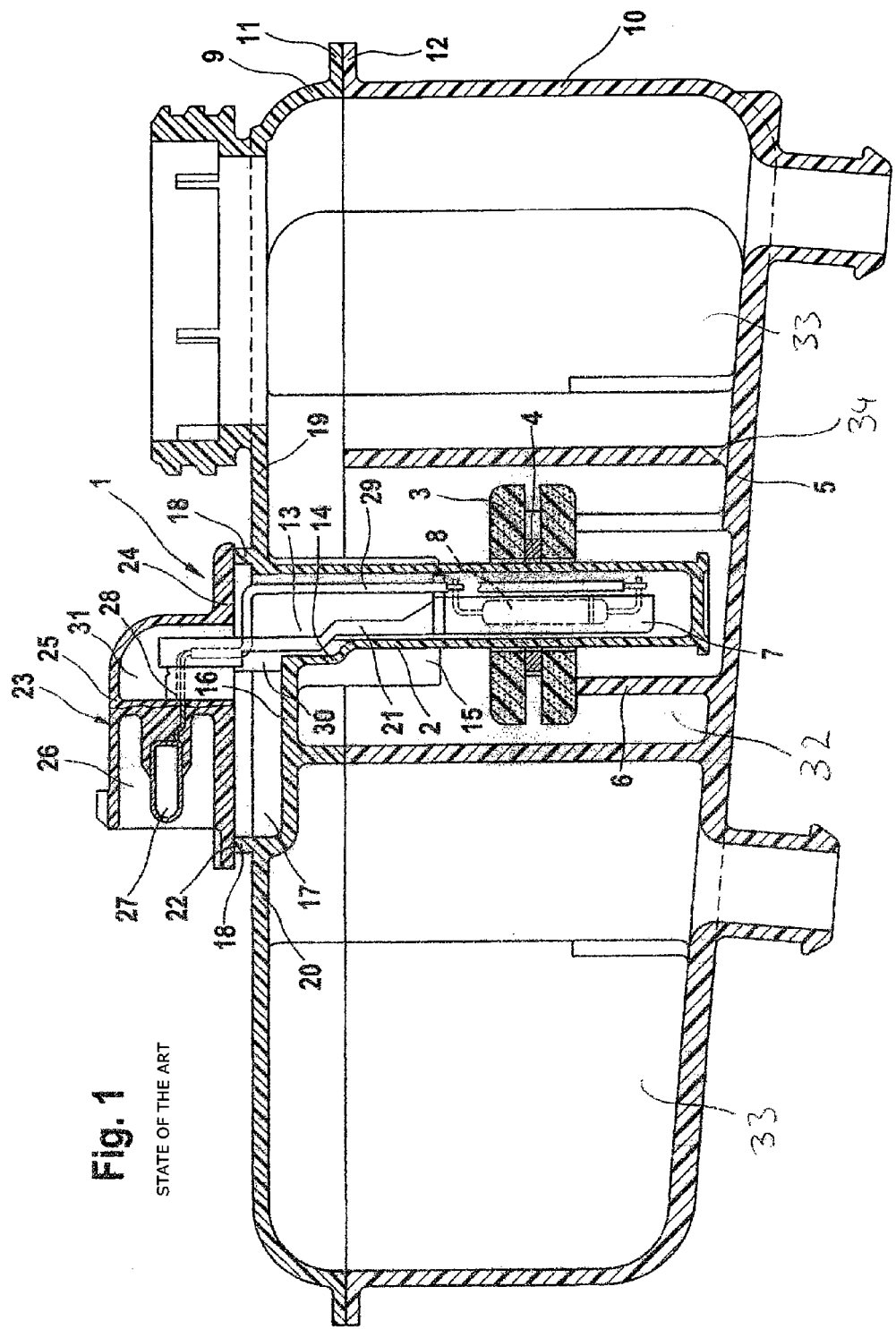
FIG. 1 a known fluid reservoir in longitudinal section.

FIG. 1 shows a known fluid reservoir 1 for brake fluid according to DE 37 16 135 A1, which is incorporated by reference, having a device for monitoring the reservoir filling level. The fluid reservoir 1 is attached, for example, to a master cylinder (not shown) of a vehicle brake system and comprises a guide sleeve 2, which projects into its reservoir interior space and which is closed at its end facing the reservoir interior space. Arranged so that it can be displaced along the guide sleeve 2, which has a circular cross section, for example, is a float 3, which is embodied as a ring, for example, and which constitutes an integral part of a device for monitoring the reservoir filling level. The float 3 carries an annular magnet 4 as magnetic pick-up. A pipe union 6, rising up from the base 5 of the fluid reservoir 1 and in part concentrically surrounding the guide sleeve 2, is intended as stop for the float 3. This stop defines the lowest position of the float 3 in the fluid reservoir 1 and prevents the float 3 from being able to leave the guide sleeve 2.

The device for monitoring the reservoir filling level comprises a switch unit having a cover 23, a contact carrier 25 and a carrier 7, which is provided in the interior of the guide sleeve 2 and to which a reed switch 8 is attached as switch element. As soon as the magnet 4 passes a switching point S (not shown) of the switch element, due to a fall in the reservoir filling level, the reed contact of the reed switch 8 closes or opens and a signal is generated for an electronic switch unit of the motor vehicle brake system. Attached to the carrier 7 is a vane 21, which extends parallel to the longitudinal axis of the guide sleeve 2 and into an inner slit 13 of a radial projection 14 of the guide sleeve 2. The guide sleeve 2 is provided with multiple ribs 15, which are arranged symmetrically staggered on its surface and which form the upper stop for the float 3. The guide sleeve 2 and the float 3 are arranged in a separate chamber 32 (float chamber), which is connected by way of a fluid connection 34 to the reservoir interior space, that is to say one or more fluid chambers 33.

At its upper end the guide sleeve 2 merges into a base 16 of a shallow cavity 17, the side walls 18 of which are connected to walls 19 and 20 of the fluid reservoir 1. The side walls 18 project a small distance beyond the walls 19, 20 of the fluid reservoir 1 and with their upper edges 22 form stop faces for the cover 23, which contains a plane base plate 24, from which the contact carrier 25 rises, the latter being welded to the side walls 18. The contact carrier 25 is provided with a recess 26, projecting into which are two contact pins 27 or blade contacts of a connector, which is inserted by one end gas and fluid-tightly into the contact carrier 25. The opposite end 28 of each contact pin 27 to the recess 26 is connected to the end of an electrical wire 29. The other ends of the electrical wires 29 are connected to the reed switch 8.

Two projections 30, which continue the walls for a short distance on opposite sides of the slit 13 and which are no higher than the side walls 18, for example, project into the cavity 17. The vane 21 extends into the space between the projections 30 and is connected to these by a suitable method (for example adhesive bonding, welding, screw attachment, pressing-on). A recess 31, into which the end of the vane 21 and where necessary the projections 30 can project, when the cover 23 closes the cavity 17, is provided in the contact carrier 25 in the part situated above the projections 30. The fluid reservoir 1 consists of a housing comprising an upper housing part 9 and a lower housing part 10, which are welded together at their edges 11, 12.

In extreme positions of the vehicle, as in braking, acceleration or cornering and under any combination of these demands, the shape of the reservoir may cause the fluid to flow out of the float chamber 32 too rapidly, so that the float 3 falls and operates the warning device. This effect can furthermore occur due to the fluid flowing out and not flowing back into the float chamber 32 rapidly enough. The operation of the warning device here gives rise to the unwanted display and/or entry in the fault memory and the driver is required to go to a service workshop in order to have the fault cleared.

The fluid reservoir 35 according to the invention, which basically in function and construction does not differ from known fluid reservoirs, therefore comprises valve means 36, which serve for controlling the fluid flow between a separate chamber 37—also termed the float chamber—and one or more fluid chambers 38. This makes it possible to counteract extreme positions of the fluid reservoir 35 and the associated fluid dynamics, so that an incorrect display of the warning device can be excluded.

FIGS. 2 to 6 show three exemplary embodiments, components which are equivalent to the components of the known fluid reservoir 1 shown in FIG. 1 being provided with the same reference numerals. Only the differences essential for the invention are examined below.

Figure 2:
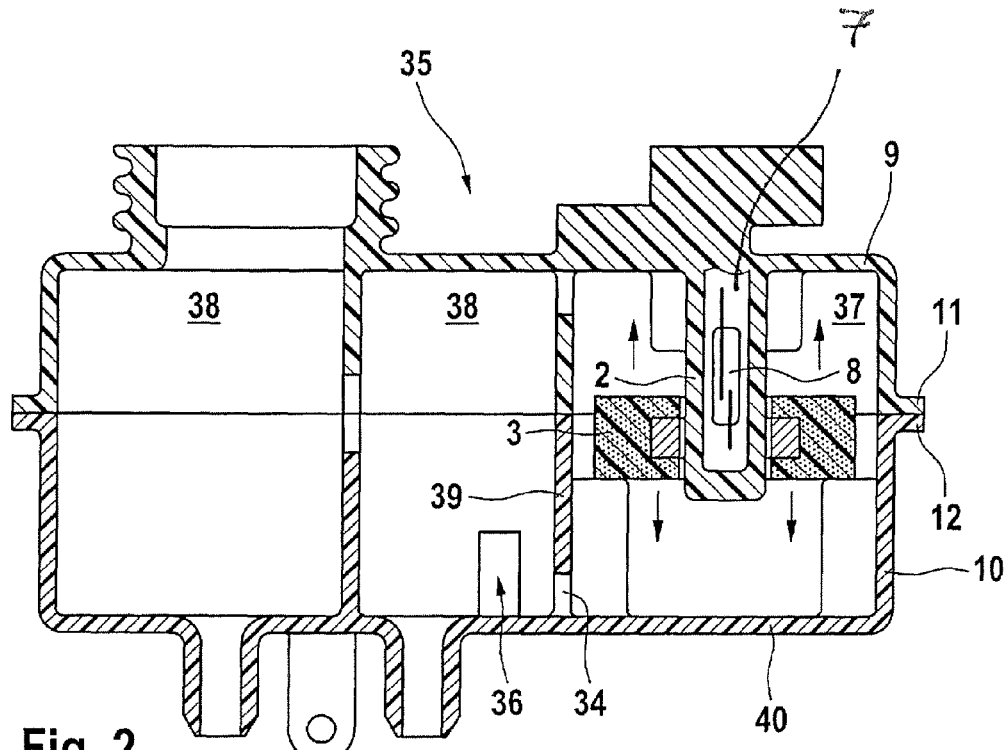
FIG. 2 a first exemplary embodiment of a fluid reservoir according to the invention in longitudinal section.
Figures 3, 5:
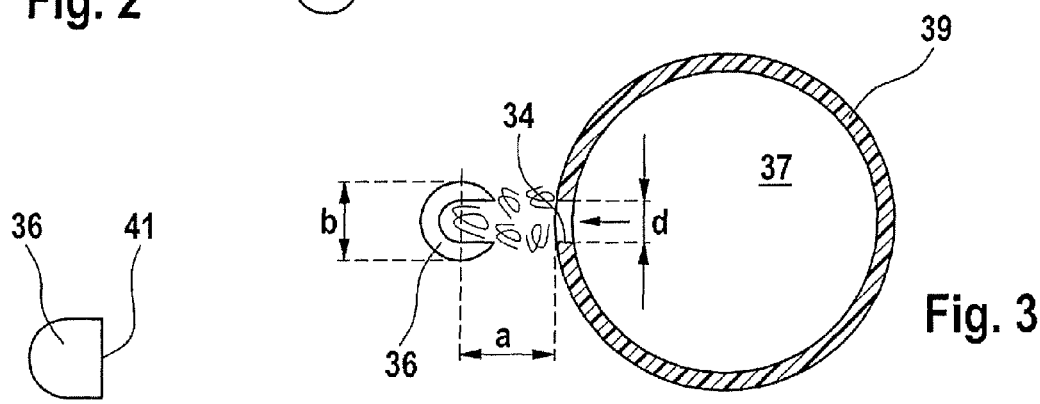
FIG. 3 a detail of the first exemplary embodiment according to FIG. 2 in cross section as the fluid flows out of the separate chamber.
FIG. 5 a valve means of a second exemplary embodiment of a fluid reservoir according to the invention in cross section and FIG. 6 a valve means of a third exemplary embodiment of a fluid reservoir according to the invention in cross section.

As can be seen, in particular, from FIG. 3, which shows a cross-sectional detail of the first exemplary embodiment shown in FIG. 2 as the fluid is flowing out of the separate chamber 37, the valve means 36 restrict the outflow of fluid from the separate chamber 37 into the fluid chamber 38.

Here the fluid connection 34 is embodied, for example, as a gap opening of a chamber wall 39 in the area of a reservoir base 40 and the valve means 36 are arranged on the reservoir base 40 at a predefined distance a from the gap opening.

The valve means 36 are advantageously embodied as a dome, which extends from the reservoir base 40 into the reservoir interior space. This facilitates manufacturing of the fluid reservoir 35 and the valve means 36. The two housing parts 9, 10 are generally manufactured as injection-molded parts, so that the dome can therefore be injection-molded onto the reservoir base 40 during manufacture of the lower housing part 10.

In addition to a width b of the valve means 36 and a diameter d of the gap opening, the distance a of the valve means 36 from the chamber wall 39 is one criterion for controlling the fluid flow, which can be varied according to the demands placed on the fluid reservoir 35. Here the shape of the gap opening is not limited to a circular shape.

Figures 4, 6:
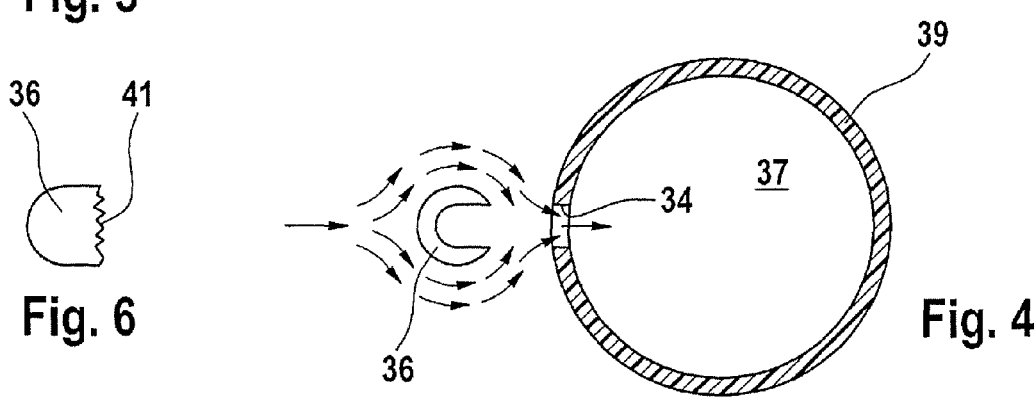
FIG. 4 the detail of the first exemplary embodiment according to FIG. 2 in cross section as the fluid flows back into the separate chamber.

According to the first exemplary embodiment, the valve means 36 provided are of substantially lunate cross section, as can clearly be seen from FIGS. 3 and 4.

The lunate shape allows the restricted outflow of fluid shown in FIG. 3 and an accelerated return, represented by arrows in FIG. 4, from the fluid chamber 38 into the separate chamber 37. An unwanted fall of the fluid filling level in the float chamber 37 is thereby excluded. At the same time fluid, which has escaped from the float chamber 37, can flow back rapidly again.

Alternative exemplary embodiments of the valve means 36 are represented in FIGS. 5 and 6. Accordingly in cross section the valve means 36 may be of substantially semi-circular design, one face 41 facing the gap opening 34. As FIG. 6 shows, the face 41 may be of uneven design for enhanced restriction of the fluid flow.

The form of the valve means 36 is not limited to the exemplary embodiments shown. It is possible to envisage all forms which restrict an outflow of the fluid from the separate chamber 37 into the fluid chamber 38 and which allow an accelerated return from the fluid chamber 38 into the separate chamber 37.

LIST OF REFERENCE NUMERALS 1 fluid reservoir
2 guide sleeve
3 float
4 magnet
5 base
6 pipe union
7 carrier
8 reed switch
9 upper housing part
10 lower housing part
11 edge
12 edge
13 slit
14 radial projection
15 rib
16 base
17 cavity
18 side wall
19 wall
20 wall
21 vane
22 edge
23 cover
24 base plate
25 contact carrier
26 recess
27 contact pin
28 end
29 wire
30 projection
31 recess
32 float chamber
33 fluid chamber
34 fluid connection
35 fluid reservoir
36 valve means
37 chamber
38 fluid chamber
39 chamber wall
40 reservoir base
41 face
a distance
b width
d diameter

The invention claimed is:

1. A motor vehicle hydraulic brake system fluid reservoir for use with an electronic control unit, the fluid reservoir comprising:
   a housing comprising a reservoir interior space with at least one fluid chamber; and
   a device for monitoring a reservoir filling level comprising a switch unit, which with a carrier projects into a guide sleeve, which extends into a separate chamber of the reservoir interior space, a sensor element or switch element arranged on the carrier being operable by a pickup carried on the guide sleeve at a switching point, at which the switch unit generates a signal for the electronic control unit, and the separate chamber being connected to the fluid chamber by way of a fluid connection,
   wherein valve means are provided, which serve to control the fluid flow between the separate chamber and the fluid chamber, and
   wherein the fluid connection is embodied as a gap opening of a chamber wall in the area of a reservoir base and the valve means are arranged on the reservoir base at a predefined distance from the gap opening.

2. The fluid reservoir as claimed in claim 1, wherein the valve means restrict an outflow of the fluid from the separate chamber into the fluid chamber and allow an accelerated return from the fluid chamber into the separate chamber.

3. The fluid reservoir as claimed in claim 1, wherein the valve means are embodied as a dome, which extends from the reservoir base into the reservoir interior space.

4. The fluid reservoir as claimed in claim 3, wherein the valve means, in cross section, are of substantially lunate design.

5. The fluid reservoir as claimed in claim 3, wherein the valve means, in cross section, are of substantially semi-circular design, one face being intended to face the gap opening.

6. The fluid reservoir as claimed in claim 1, wherein the valve means, in cross section, are of substantially lunate design.

7. The fluid reservoir as claimed in claim 1, wherein the valve means, in cross section, are of substantially semi-circular design, one face being intended to face the gap opening.

8. The fluid reservoir as claimed in claim 7, wherein the one face is of an uneven design.

* * * * *